United States Patent
Nien et al.

(10) Patent No.: US 12,051,942 B2
(45) Date of Patent: Jul. 30, 2024

(54) STRUCTURE OF HIGH-FREQUENCY ROTARY MECHANISM

(71) Applicant: HIWIN MIKROSYSTEM CORP., Taichung (TW)

(72) Inventors: Yu-Cheng Nien, Taichung (TW); Ruei-Bin Shiao, Taichung (TW); Zhe-Wei Cheng, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 245 days.

(21) Appl. No.: 17/880,466

(22) Filed: Aug. 3, 2022

(65) Prior Publication Data

US 2024/0048011 A1  Feb. 8, 2024

(51) Int. Cl.
 *H02K 1/276* (2022.01)

(52) U.S. Cl.
 CPC ......... *H02K 1/276* (2013.01); *H02K 2213/03* (2013.01)

(58) Field of Classification Search
 CPC .......................... H02K 1/276; H02K 2213/03
 See application file for complete search history.

(56) References Cited

U.S. PATENT DOCUMENTS

| 9,742,248 | B2 | 8/2017 | Doi et al. |
| 2007/0145851 | A1 | 6/2007 | Kikuchi et al. |
| 2007/0222319 | A1* | 9/2007 | Yoshikawa ............ H02K 1/276 310/156.53 |
| 2008/0224558 | A1* | 9/2008 | Ionel ..................... H02K 1/2766 310/156.57 |
| 2009/0278416 | A1 | 11/2009 | Ida et al. |
| 2011/0079325 | A1 | 4/2011 | Doi et al. |
| 2013/0169094 | A1 | 7/2013 | Lee et al. |
| 2020/0195070 | A1* | 6/2020 | Tan ....................... H02K 15/03 |
| 2021/0211005 | A1* | 7/2021 | Zhang ................... H02K 1/2766 |

FOREIGN PATENT DOCUMENTS

| CN | 109742879 | 5/2019 |
| DE | 102006011738 | 9/2007 |
| DE | 102019135896 | 7/2021 |
| JP | 2006-333656 | 12/2006 |
| JP | 2009153352 | 7/2009 |
| JP | 2010110096 | 5/2010 |

(Continued)

*Primary Examiner* — Mohamad A Musleh
(74) *Attorney, Agent, or Firm* — Guice Patents PLLC

(57) ABSTRACT

In an improved structure of high-frequency rotary mechanism, permanent magnets with an odd number of at least five are disposed in each pole of a motor rotor, one of the permanent magnets serves as a center, the other permanent magnets are symmetrically connected in series on two sides of the center, and adjacent ends of the permanent magnets located on two sides are made as a same magnetic pole, so that the adjacent ends are separated without directly abutting against each other by a repulsion distance under a repulsive effect of the same pole, relative positions between the adjacent permanent magnets are maintained by the repulsive effect, and structures of position limiting and support in the prior art for positioning are not required, thereby avoiding centrifugal force of high-speed rotation to act on the structures of position limiting and support, and reducing negative impact on a rotor iron core.

9 Claims, 4 Drawing Sheets

(56) References Cited

FOREIGN PATENT DOCUMENTS

| | | |
|---|---|---|
| JP | 2010-284062 | 12/2010 |
| JP | 2021108507 | 7/2021 |
| TW | 200403914 | 3/2004 |
| TW | I462435 | 11/2014 |
| WO | 2010058609 | 4/2012 |
| WO | WO2020110191 | 6/2020 |

* cited by examiner

STRUCTURE OF HIGH-FREQUENCY ROTARY MECHANISM

BACKGROUND OF THE INVENTION

Field of Invention

The invention is related to high-frequency rotary motor technology, and more particularly to an improved structure of high-frequency rotary mechanism.

Related Art

In the U.S. patent application Ser. No. 17/461,739, the applicant provides a rotor technology that can reduce the stress concentration phenomenon of a rotor with an imperfect roundness under high-frequency rotation to increase the service life of components, but because it is disposed in the magnetic unit of each pole, the volume and mass of each of the permanent magnets are relatively large, and the centrifugal force generated during high-speed rotation will cause stress concentrations to the rotor iron core, and therefore the rotor iron core still has the risk of being damaged or deformed.

SUMMARY OF THE INVENTION

Therefore, a main object of the invention is to provide an improved structure of high-frequency rotary mechanism capable of reducing a stress effect on an iron core caused by a centrifugal force of permanent magnets when a motor rotor rotates at a high frequency, thereby reducing a possibility of deformation or damage to the iron core of the motor rotor.

In order to achieve the above object, main technical features of an improved structure of high-frequency rotary mechanism provided by the invention are that: permanent magnets with an odd number of at least five are disposed in each pole of a motor rotor, one of the permanent magnets serves as a center, and the rest of the permanent magnets are symmetrically connected in series on two sides of the center, and adjacent ends of the permanent magnets located on two sides are made as a same magnetic pole, so that the adjacent ends are separated without directly abutting against each other by a repulsion distance under a repulsive effect of the same pole, relative positions between the adjacent permanent magnets are maintained by the above-mentioned repulsive effect, and structures of position limiting and support in the prior art for positioning are not required, thereby avoiding centrifugal force of high-speed rotation to act on the structures of position limiting and support, reducing negative impact on a rotor iron core, and using a large number of the dispersed permanent magnets with small volume and mass to disperse an effect of centrifugal force, and further reducing a possibility of deformation or damage to the rotor iron core.

In order to realize the above-mentioned technical features, the improved structure of high-frequency rotary mechanism comprises a rotating element composed of a rotor part of a spindle motor, a plurality of accommodating grooves, a plurality of first positioning protrusions, and a plurality of magnetic sets composed of the permanent magnets, wherein the rotating element has a tubular annular body, an inner annular surface that is circular in a radial section of the body is located on an inner peripheral annular side of the body, an outer annular surface that is non-circular in a radial section of the body is located on an outer peripheral annular side of the body, and the outer annular surface is formed by a plurality of first arcuate surfaces and a plurality of second arcuate surfaces with different radians sequentially alternatively connected in series, wherein a maximum straight distance between a center of circle of the inner annular surface and the first arcuate surface is greater than a maximum straight distance between the center of circle of the inner annular surface and the second arcuate surface.

The accommodating grooves are arcuately hole-shaped respectively, distributed annularly along a circumference of the body, disposed between the first arcuate surface and the inner annular surface, extend along the center of circle of the inner annular surface with a predetermined depth on the body axially, and extend arcuately along the circumference of the body with an arc length of a predetermined width.

The first positioning protrusions are respectively protruded in pairs on a side groove wall of each of the accommodating grooves to separate each of the accommodating grooves into a first space between the paired first positioning protrusions, and two second spaces located on two sides of the first space.

A number of the magnetic sets is the same as a number of poles of the motor, the magnetic sets are respectively embedded and accommodated in each of the accommodating grooves, and have the at least five permanent magnets respectively, wherein a first permanent magnet located in the center is located in the first space, two second permanent magnets on two sides are respectively located in each of the second spaces and away from the first permanent magnet, and two third permanent magnets are respectively located in each of the second spaces and between each of the second permanent magnets and the first permanent magnet, one end of the third permanent magnet abuts against the first positioning protrusion, and another end of the third permanent magnet has a magnetic pole the same as that of one end of the adjacent second permanent magnet, so that the third permanent magnet and the adjacent second permanent magnet are separated by the repulsion distance, and without structure protruding from the groove wall of the accommodating groove in the repulsion distance.

Further, in order to improve electromagnetic characteristics of the rotor, the improved structure of high-frequency rotary mechanism can further comprise a plurality of magnetic barrier spaces and a plurality of second positioning protrusions, wherein the magnetic barrier spaces are respectively disposed on the body, and respectively connected and communicated with two ends of each of the accommodating grooves in a width direction; each of the second positioning protrusions is disposed on the body and between each of the magnetic barrier spaces and one end of each of the accommodating grooves, and abuts against another end of the second permanent magnet to limit a position of each of the second permanent magnets.

DETAILED DESCRIPTION OF THE INVENTION

Figure 1:
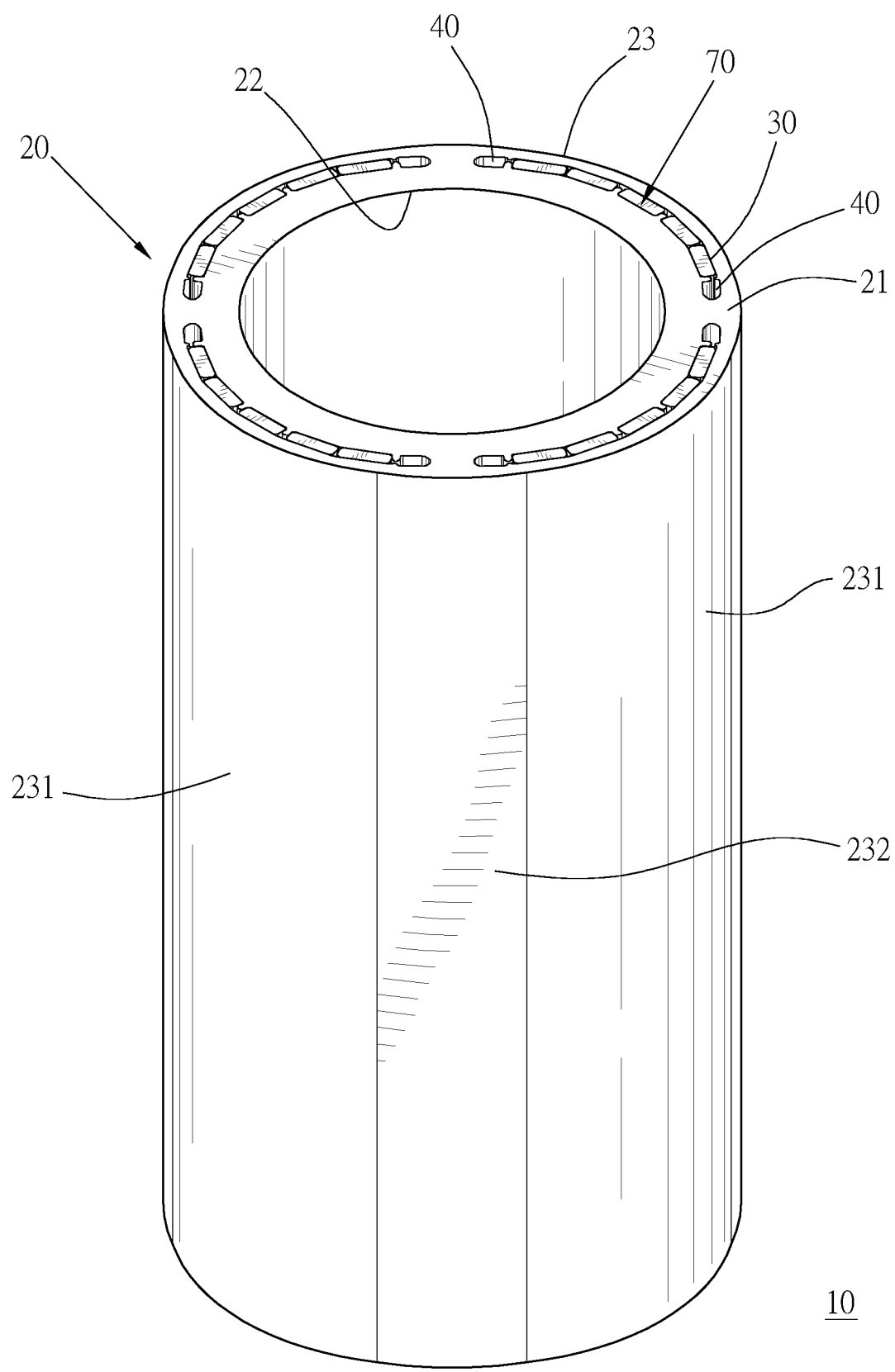
FIG. 1 is a perspective view of a preferred embodiment of the invention.

Firstly, please refer to FIG. 1, an improved structure 10 of high-frequency rotary mechanism provided in a preferred embodiment of the invention is implementation as a rotor component of a conventional spindle motor, and structurally mainly comprises a rotating element 20, a plurality of accommodating grooves 30, a plurality of magnetic barrier spaces 40, a plurality of first positioning protrusions 50, a plurality of second positioning protrusions 60, and a plurality of magnetic sets 70.

Figure 2:
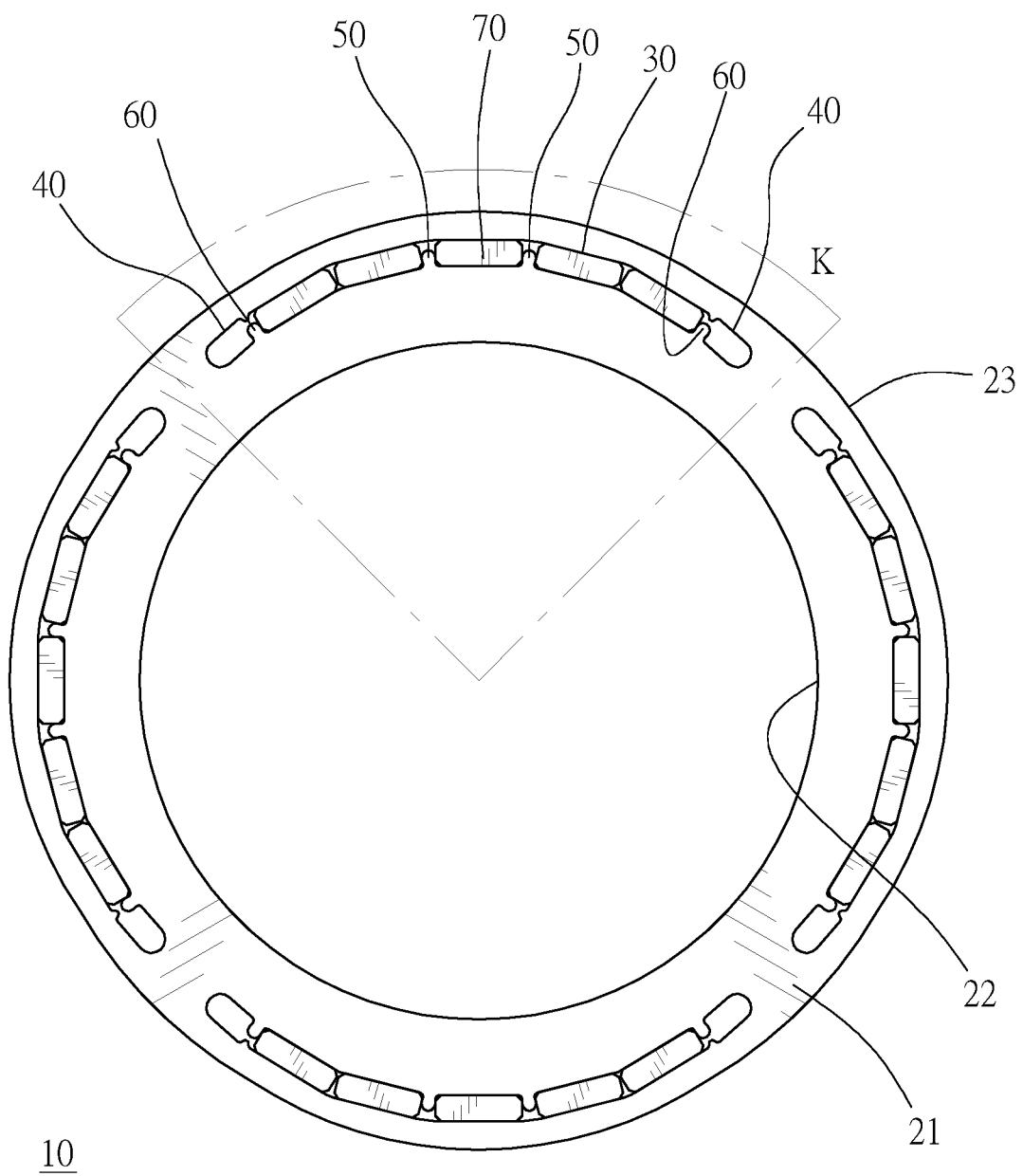
FIG. 2 is an end view of a preferred embodiment of the invention.

Please also refer to FIG. 2, the rotating element 20 is formed by coaxially stacking a plurality of annular silicon steel plates in sequence, and has a generally tubular annular body 21, an inner annular surface 22 is located on an inner peripheral annular side of the body 21, and a ring of the inner annular surface 22 is circular in a radial section of the body 21, an outer annular surface 23 is located on an outer peripheral annular side of the body 21, a ring of the outer annular surface 23 is different from a circular shape of the inner annular surface 22, and the outer annular surface 23 is formed by a plurality of first arcuate surfaces 231 and a plurality of second arcuate surfaces 232 with different radians sequentially alternatively connected in series, so that the outer annular surface 23 is non-circular in a radial section of the body 21 like a plum blossom, wherein a maximum straight distance between a center of circle of the inner annular surface 22 and the first arcuate surface 231 is greater than a maximum straight distance between the center of circle of the inner annular surface 22 and the second arcuate surface 232.

The accommodating grooves 30 are respectively in the shape of a hole, and has a number equal to a number of poles of the spindle motor, in this embodiment, a number of the accommodating grooves 30 is four, the accommodating grooves 30 are equally annularly distributed along a circumference of the body 21, disposed between the first arcuate surface 231 and the inner annular surface 22, extend and penetrate two axial ends of the body 21 along a tube axis direction of the body 21, and extend arcuately along the circumference of the body 21 with an arc length of a predetermined width.

Each of the hole-shaped magnetic barrier spaces 40 penetrates through the body 21, and connects and communicates with two ends of each of the accommodating grooves 30 in a width direction.

Figure 3:
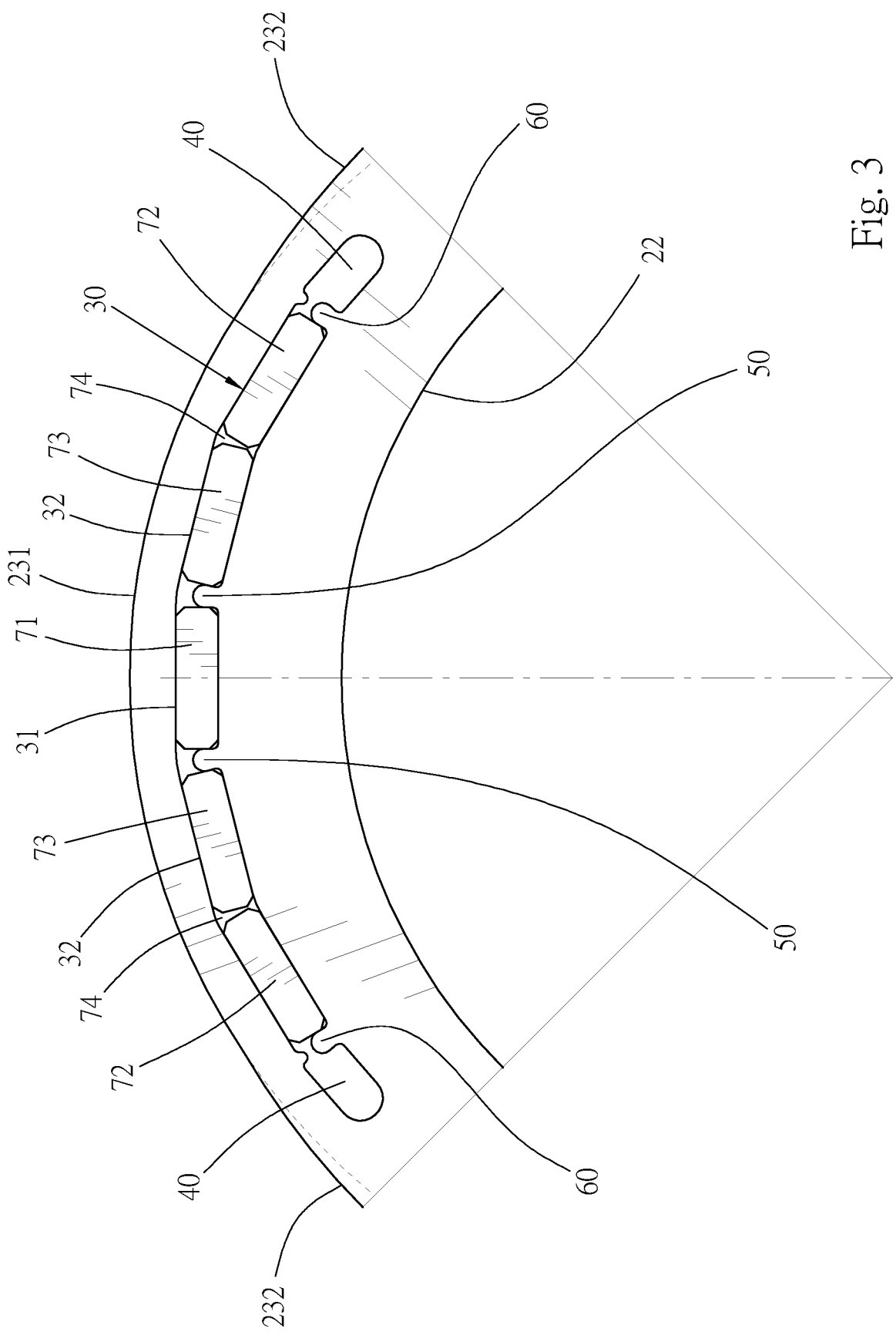
FIG. 3 is a partial enlarged view of a preferred embodiment of the invention along the K area in FIG. 2.

Please refer to FIG. 3, the first positioning protrusions 50 are protruded in pairs on a side groove wall in a middle position of each of the accommodating grooves 30, and the paired first positioning protrusions 50 are spaced apart from each other, so that a hole space of each of the accommodating grooves 30 is divided into a first space 31 between each pair of the first positioning protrusions 50, and two second spaces 32 located on two sides of the first space 31.

Each of the second positioning protrusions 60 is disposed on the body 21, and disposed between each of the magnetic barrier spaces 40 and one end of each of the accommodating grooves 30 in a width direction.

Each of the magnetic sets 70 is accommodated in each of the accommodating grooves 30, and comprises a first permanent magnet 71 located in the first space 31, and two second permanent magnets 72 and two third permanent magnets 73 located in the second space 32. When viewing from a radial section of the body 21, a shape of the first permanent magnet 71 is generally rectangular, and two ends of a rectangular long axis of the first permanent magnet 71 respectively abut against each of the first positioning protrusions 50 to limit a position of the first permanent magnet 71 and support it. Each of the second permanent magnets 72 is also generally rectangular, and one end of a rectangular long axis of each of the second permanent magnets 72 abuts against each of the second positioning protrusions 60. Each of the third permanent magnets 73 is rectangular, and disposed between the first permanent magnet 71 and each of the second permanent magnets 72, so that one end of a rectangular long axis of each of the third permanent magnets 73 abuts against each of the first positioning protrusions 50, and another end of the rectangular long axis of each of the third permanent magnets 73 has a magnetic pole the same as that of another end of the rectangular long axis of the adjacent second permanent magnet 72, and therefore the third permanent magnet 73 and the adjacent second permanent magnet 72 do not directly contact each other under a repulsive effect of the same magnetic pole, and form a repulsion distance 74 that is close to a taper shape such as a fan shape or a wedge shape.

By increasing a number of the permanent magnets in each of the magnetic sets 70, a mass of the single permanent magnet itself can be relatively reduced, thereby reducing a centrifugal force generated by the single permanent magnet under high-frequency rotation to achieve an efficacy of dispersing stress acting on the rotating element 20, further enabling each of the second permanent magnets 72 and each of the third permanent magnets 73 to have same volume and mass substantially to achieve optimal dispersion effect.

Furthermore, due to the existence of the repulsion distances 74, between the adjacent ends of the second permanent magnets 72 and the third permanent magnets 73, there is no need for shaped members such as the first positioning protrusions 50 protruding from the groove wall of the accommodating groove 30, their positions relative to each other can be maintained under a repulsive effect of a same magnetic pole to achieve an effect of limiting position. Under high-frequency rotation, the repulsive effect of the same magnetic pole is capable of avoiding stress caused by centrifugal force, further reducing a stress caused by a centrifugal force acted on the rotating element 20.

Figure 4:
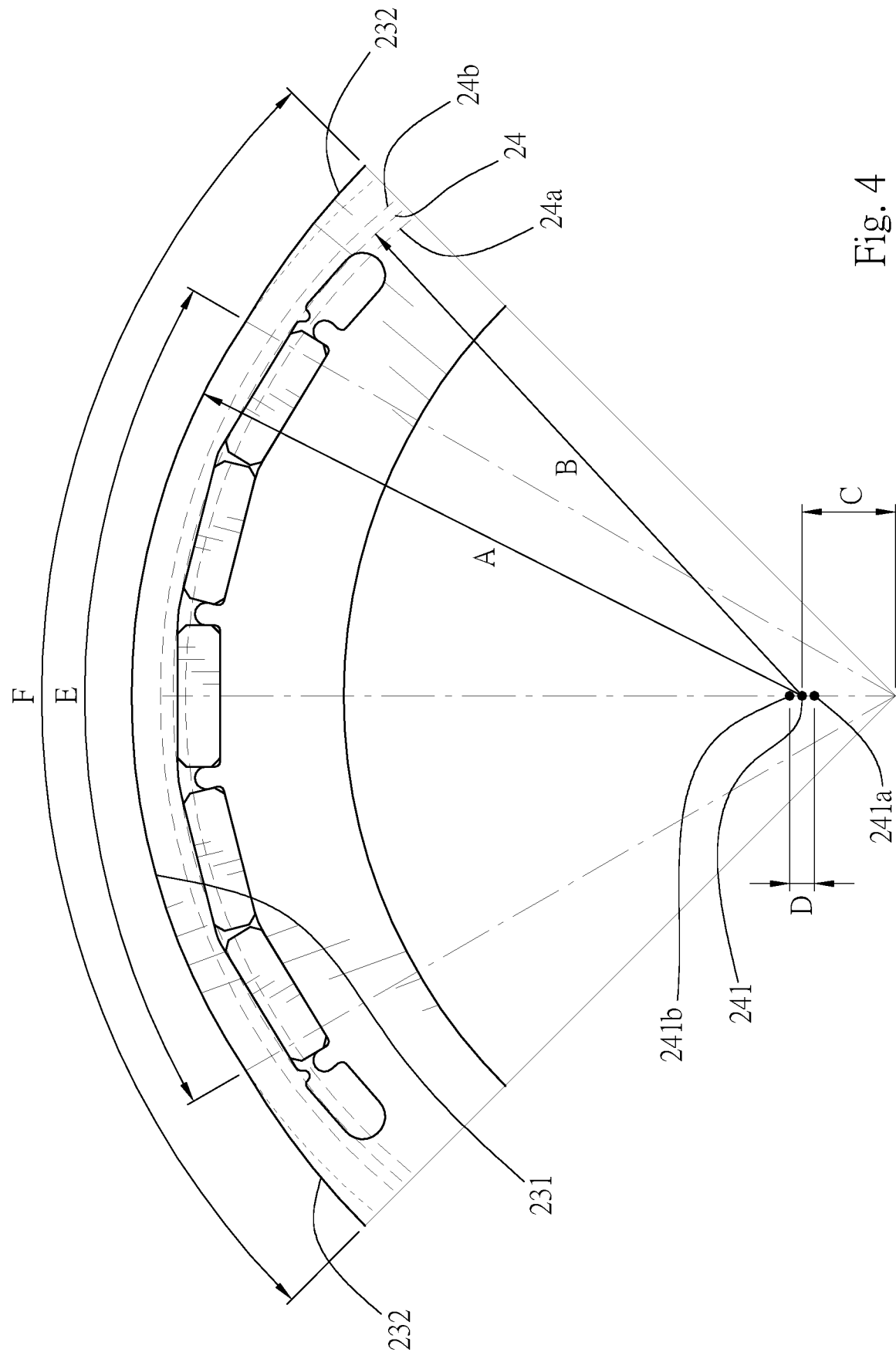
FIG. 4 is a partial enlarged view of a preferred embodiment of the invention along the K area in FIG. 2.

In order to achieve optimal structural rigidity and electromagnetic characteristics, the above-mentioned embodiment can be further optimized, please refer to FIG. 4.

For a relationship between poles of the motor and the first arcuate surface 231, the following equations are satisfied between the poles of the motor and the first arcuate surface 231:

$$F=360/P, \alpha=E/F\times 100\%, \text{ and } \alpha \text{ is between } 50\% \text{ and } 98\%;$$

in the equations, P is a number of the motor poles, F is an angle of spread of the single pole of the motor, and E is an angle of spread of the first arcuate surface 231.

For each of the magnetic sets 70, a center of curvature of an arc defined by connecting centers of mass of the permanent magnets is not concentric with the center of circle of the inner annular surface 22, so that a corner of each of the permanent magnets is tangent to an imaginary reference arc 24, the reference arc 24 is assumed to be an imaginary circle with a center of curvature of the first arcuate surface 231 as a center of circle, and an imaginary radius B of the reference arc 24 and a radius A of the first arcuate surface 231 satisfy $0.5A \leq B \leq 0.95A$.

Further, equation $D \leq 0.4C$ can be used to select an assumed position of a center of circle of the reference arc 24, C in the equation is a radial distance between the center of curvature of the first arcuate surface 231 and the center of circle of the inner annular surface 22, D in the equation is a radial translation distance of the center of circle of the reference arc 24. In detail, the center of curvature of the first arcuate surface 231 serves as a central position of a range of D, and is a range of outward or inward displacement relative to the center of circle of the inner annular surface 22 in a radial direction, as shown in FIG. 4, the imaginary radius B is a fixed value, when the selected D=0, a center of circle takes the center of curvature of the first arcuate surface 231 as an origin position 241, and the reference arc 24 is imagined; when the selected D=0.4, two boundary positions 241*a*, 241*b* of an assumed range of a center of circle are located on two sides of the origin position 241 respectively, and reference arcs 24*a*, 24*b* are imagined.

What is claimed is:

1. An improved structure of high-frequency rotary mechanism comprising:
    a rotating element having a tubular annular body, an inner annular surface formed circularly in a radial section of the body being located on an inner peripheral annular side of the body, an outer annular surface formed non-circularly in a radial section of the body being located on an outer peripheral annular side of the body, the outer annular surface being formed by a plurality of first arcuate surfaces and a plurality of second arcuate surfaces with two different radians sequentially alternatively connected in series, wherein a maximum straight distance between a center of circle of the inner annular surface and the first arcuate surface is greater than a maximum straight distance between the center of circle of the inner annular surface and the second arcuate surface;
    a plurality of arcuately hole-shaped accommodating grooves distributed annularly along a circumference of the body, disposed between the first arcuate surface and the inner annular surface, extending along the center of circle of the inner annular surface with a predetermined depth on the body axially, and extending arcuately along the circumference of the body with an arc length of a predetermined width;
    a plurality of paired first positioning protrusions, each pair of the first positioning protrusions being spaced apart from each other and respectively protruded on one side groove wall of each of the accommodating grooves to separate each of the accommodating grooves into a first space between the paired first positioning protrusions, and two second spaces located on two sides of the first space;
    a plurality of magnetic sets accommodated in each of the accommodating grooves and respectively comprising a first permanent magnet located in the first space, two ends of the first permanent magnet respectively abutting against the paired first positioning protrusions, two second permanent magnets respectively located in each of the second spaces and away from the first permanent magnet, and two third permanent magnets respectively located in each of the second spaces and between each of the second permanent magnets and the first permanent magnet, one end of the third permanent magnet abutting against the first positioning protrusion, and another end of the third permanent magnet having a magnetic pole the same as that of one end of the adjacent second permanent magnet, so that the third permanent magnet and the adjacent second permanent magnet being separated by a repulsion distance, and without structure protruding from the groove wall of the accommodating groove in the repulsion distance;
    a plurality of hole-shaped magnetic barrier spaces respectively disposed on the body, and respectively connected and communicated with two ends of each of the accommodating grooves in a width direction; and
    a plurality of second positioning protrusions respectively disposed on the body and between each of the magnetic barrier spaces and one end of each of the accommodating grooves, and abutting against another end of the second permanent magnet to limit a position of each of the second permanent magnets.

2. The improved structure of high-frequency rotary mechanism as claimed in claim 1, wherein each of the second permanent magnets and each of the third permanent magnets respectively have same volume and mass substantially.

3. The improved structure of high-frequency rotary mechanism as claimed in claim 1, wherein each of the magnetic sets is arranged along an imaginary reference arc, and a corner of each of the first permanent magnets, each of the second permanent magnets, and each of the third permanent magnets are respectively tangent to the reference arc.

4. The improved structure of high-frequency rotary mechanism as claimed in claim 3, wherein the reference arc is concentric with a center of curvature of the first arcuate surface, and a radius B of the reference arc and a radius A of the first arcuate surface satisfy $0.5A \leq B \leq 0.95A$.

5. The improved structure of high-frequency rotary mechanism as claimed in claim 3, wherein an assumed position of a center of circle of the reference arc is located at a central position of the center of curvature of the first arcuate surface, and offset within a range of a translation distance D along a radial direction of the first arcuate surface, and the translation distance D is smaller than a distance C between the center position and the center of circle of the inner annular surface, and satisfies $D \leq 0.4C$.

6. The improved structure of high-frequency rotary mechanism as claimed in claim 1, wherein a center of curvature of an arc defined by connecting centers of mass of the first permanent magnet, each of the second permanent magnets, and each of the third permanent magnets in each of the magnetic sets is not concentric with the center of circle of the inner annular surface.

7. The improved structure of high-frequency rotary mechanism as claimed in claim 1, being a rotor element of a spindle motor.

8. The improved structure of high-frequency rotary mechanism as claimed in claim 7, wherein each of the magnetic sets corresponds to a single pole of the spindle motor, and an angle of spread E of the first arcuate surface, an angle of spread F of the single pole, and a pole number P of the spindle motor, satisfy the following equations:

$F=360/P$, $\alpha=E/F \times 100\%$, and $\alpha$ is between 50% and 98%.

9. The improved structure of high-frequency rotary mechanism as claimed in claim 1, wherein the repulsion distance on a radial section of the body is shaped like a fan.

* * * * *